US008126857B2

(12) United States Patent
Maitino et al.

(10) Patent No.: US 8,126,857 B2
(45) Date of Patent: Feb. 28, 2012

(54) PROACTIVE INFORMATION MONITORING SYSTEMS AND METHODS

(75) Inventors: Philip M. Maitino, Laguna Niguel, CA (US); Robert Hull, Rancho Santa Margarita, CA (US)

(73) Assignee: Melissa Data Corp., Rancho Santa Margarita, CA (US)

( * ) Notice: Subject to any disclaimer, the term of this patent is extended or adjusted under 35 U.S.C. 154(b) by 645 days.

(21) Appl. No.: 12/209,393

(22) Filed: Sep. 12, 2008

(65) Prior Publication Data

US 2010/0070479 A1 Mar. 18, 2010

(51) Int. Cl.
*G06F 17/30* (2006.01)

(52) U.S. Cl. ....................................... 707/694; 707/702

(58) Field of Classification Search ........................ None
See application file for complete search history.

(56) References Cited

U.S. PATENT DOCUMENTS

| | | | |
|---|---|---|---|
| 6,704,874 B1 | 3/2004 | Porras et al. | |
| 7,130,812 B1 | 10/2006 | Iyer et al. | |
| 7,209,916 B1 | 4/2007 | Seshadri et al. | |
| 7,310,615 B2 | 12/2007 | Lewis | |
| 7,545,816 B1 * | 6/2009 | Coutts et al. | 370/400 |
| 2002/0046157 A1 * | 4/2002 | Solomon | 705/37 |
| 2002/0087643 A1 * | 7/2002 | Parsons et al. | 709/206 |
| 2002/0147622 A1 * | 10/2002 | Drolet et al. | 705/7 |
| 2002/0178077 A1 * | 11/2002 | Katz et al. | 705/26 |
| 2003/0110087 A1 * | 6/2003 | Rao et al. | 705/26 |
| 2003/0144852 A1 * | 7/2003 | Eckert et al. | 705/1 |
| 2003/0154129 A1 * | 8/2003 | Goff | 705/14 |
| 2003/0212673 A1 * | 11/2003 | Kadayam et al. | 707/3 |
| 2004/0254819 A1 * | 12/2004 | Halim et al. | 705/5 |
| 2004/0267660 A1 * | 12/2004 | Greenwood et al. | 705/38 |
| 2008/0162420 A1 * | 7/2008 | Ahrens et al. | 707/2 |

OTHER PUBLICATIONS

ActionBridge™ from http://www.nimaya.com/.
Google™ Alerts from (http://www.google.com/alerts).

* cited by examiner

*Primary Examiner* — Mohammad Ali
*Assistant Examiner* — Syed H Hasan
(74) *Attorney, Agent, or Firm* — Fish & Associates, PC

(57) ABSTRACT

Systems and methods for proactive information monitoring are presented. A user can define alert criteria for generating an alert through a centralized alerting service where the alert criteria relate to the status of records in a data set. The records of the data can be distributed across multiple remote or unaffiliated databases to which the user lacks access. The service can disaggregate the criteria into individual criterion targeting specific records stored in the databases. The criterions are provided to agents that monitor the records. When the records satisfy the criterion, the agents send notifications back to the service. Once the service receives sufficient notifications to indicate the alert criteria are satisfied, the service sends an alert to designated recipients. The systems and methods are able provide alert information without compromising the confidentially or security of the remote databases.

20 Claims, 4 Drawing Sheets

PROACTIVE INFORMATION MONITORING SYSTEMS AND METHODS

FIELD OF THE INVENTION

The field of the invention is data monitoring technologies.

BACKGROUND

Businesses often have databases storing customer related information including names, address, demographics, interests, technical support issues, or other customer data. Businesses use the information to maintain relationships with the customers in support of potential future sales to the customers. Unfortunately, the customer information can become quite stale if the customer's data is not updated regularly. Even if a customer database is updated in a timely fashion, a business might simply lack relevant data with respect to changes of a customer's circumstance. For example, a customer might make a large, high dollar value purchase. Such information would likely never be visible to most businesses, but might reside in the database owned by the store that made the sale. However, such information or changes in the customer's circumstances could represent new opportunities to other third-party businesses. Preferably the businesses could be alerted when a new opportunity arises as a customer's data set changes if the customer's data set is spread over many distinct or unaffiliated databases.

Others have addressed some aspects of providing business with alerts relating to changes in customer's data set. For example, SalesForce™ of San Francisco, Calif., (http://www.salesforce.com) provides Customer Relation Management (CRM) solutions through a software-as-a-service (SaaS) business model. SalesForce offers an alerting package called ActionBridge™ developed by Nimaya™ of McLean, Va., (http://www.nimaya.com/) that allows users to define alert criteria based on changes of information in the user's customer database stored on SalesForce. Unfortunately, ActionBridge lacks support for real-time response and fails to address circumstances where the customer's information is stale or otherwise out of date.

Some effort has been directed to generating timely alerts. For example, U.S. Pat. No. 7,310,615 to Lewis et al., titled "Financial Data Reporting System with Alert Notification Feature and Free-Form Searching Capability", provides for real-time data entry and reporting to interested parties. Another, more generic example of timely alerts includes U.S. Pat. No. 7,209,916 to Seshadri et al., titled "Expression and Flexibility Framework for Providing Notifications". However, Seshadri merely provides for receiving alerts from various sources. Yet another even more generic example of alerting includes Google™ Alerts (http://www.google.com/alerts) where a person can submit search terms; Google generates alerts that match the terms and sends the alerts to the person periodically, or as they are available. In all the above cases, alerts are merely generated based on data existing in a centralized database. Even though data in the databases can be updated, the data can still be stale. Additionally, such alerting systems lack access to other data sources that could have additional information that would increase the value of alerts. For example, Google must aggregate data from multiple, public sources into a single, large database before generating an alert. Google lacks access to other databases that are kept confidential, secured, or private that could have data set records of interest. Consequently, the result is a non-real-time alert based on stale or irrelevant information.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

The preceding approaches simply fail to adequately provide for accessing up-to-date records of a data set spread across multiple data sources. Ideally an alerting system should bridge across multiple, unaffiliated data sources to provide high value alerts. Unfortunately, owners of the private databases do not allow access to their data sets for various reasons including preserving confidentially, ensuring the security or integrity of the database, or simply not having a financial motivation to do so. Certainly no database owner would allow Google or other institution to download confidential, private data into a publicly accessible system.

It has yet to be appreciated that data from private or unaffiliated databases can be integrated into an alerting system while addressing the concerns of the database owners. Rather than aggregating data into a centralized database to generate desired alerts, it would be possible to disaggregate alert criteria into individual criterions corresponding to individual records of a data set located on remote, unaffiliated databases. An authorized monitoring agent can monitor changes to privately stored records of the data set and notify a centralized alerting system when a record satisfies the criterion. The centralized alerting system aggregates notifications from multiple agents and sends an alert to any interested parties when the alert criteria is met. Such an approach ensures that each remote database retains its security, integrity, and confidentiality.

Consider, for example, a bank having a local, private database of customers having high interest rate mortgages. The information in the database might be stale or might be current with respect to their customer's financial needs. Additionally, consider a home improvement store having a database that includes the same customer's purchasing habits. The two databases are unaffiliated with each other and lack access to each others data records. However, a third party mortgage broker might be interested when the customer makes a large purchase at the home improvement store because it could indicate that the customer would be interested in refinancing their mortgage to obtain money to pay for a home improvement project. The mortgage broker, or other entity, could define alert criteria corresponding to the customer's mortgage interest rate and corresponding to the customer's home improvement purchases. When the criteria are met, the alert is sent to the mortgage broker indicating that a customer has met their desired profile as a potential contact.

Thus, there is still a need for a proactive information monitoring system that provide alerts to changes in a data while also preserving the confidentiality of data in privately owned databases where record of the data can be found.

SUMMARY OF THE INVENTION

The present invention provides apparatus, systems and methods in which information can be proactively monitored across a plurality of unaffiliated databases. One aspect of the inventive subject matter includes using a Central Alerting System (CAS) to send alerts to interested parties when records of a data set change. An alert criteria can be defined where each criterion of the criteria corresponds to a record of the data set. A monitoring agent receives a criterion and monitors a remote database storing the record corresponding to the criterion. When the record satisfies the criterion, the agent sends a notification back to the CAS indicating the record has met the criterion. The CAS aggregates notifications from all relevant agents to determine if all criterions of the alert's criteria are satisfied. Once the alert criteria is met, the CAS can send an alert to a recipient.

The alert sent to an interested party can be packaged with any additional data as desired. For example, the data can include information pertaining to the criteria, alert identification, or possibly information relating to the records that were being monitored. Alerts can be sent via numerous communication channels including web-based system (e.g., web pages, blogs, etc. . . . ), text communications (e.g., emails, text messages, etc. . . . ), or audio communications (e.g., phone call, voice mail, etc. . . . ). In some embodiments, the alert can also comprise a command directing a database operated or owned by the interested party to store information relating to the alert.

In other aspects of the inventive subject matter, the CAS can be operated as a for-fee service for interested parties. CAS customers preferably pay the CAS service in exchange for receiving alerts. The CAS service can provide customers one or more interfaces through which they can define alert criteria. It is also contemplated that partnerships can be established with the owners of the remote databases to allow the CAS service to monitor records on their databases. The owners can also be compensated in exchange for providing access to their databases.

As used herein a "data set" is used generically to refer to a group of records that pertain to an alert. The records of the data set can be local or remote to any entity, and local or remote the CAS. An example data set includes customer information where the customer's name and address (a first record) is stored a first database, and the customer's political affiliation (a second record) is stored on a second, remote database.

Various objects, features, aspects and advantages of the inventive subject matter will become more apparent from the following detailed description of preferred embodiments, along with the accompanying drawings in which like numerals represent like components.

DETAILED DESCRIPTION

The following discussion describes the inventive subject matter with respect to various numbers of records in a data set, databases, alert criteria, or other items. One skilled in the art will recognize that the inventive subject matter can scale as necessary to any number of items without departing from the inventive subject matter.

Additionally, the following discussion relates to various elements of the alerting system as being remote relative to other elements. As used herein "remote" means that the elements are separated physically from each other, yet able to communicate. In some embodiments, elements can be separated by geographically significant distances (e.g., greater than 10 Km).

Alerting System Overview

Figure 1:
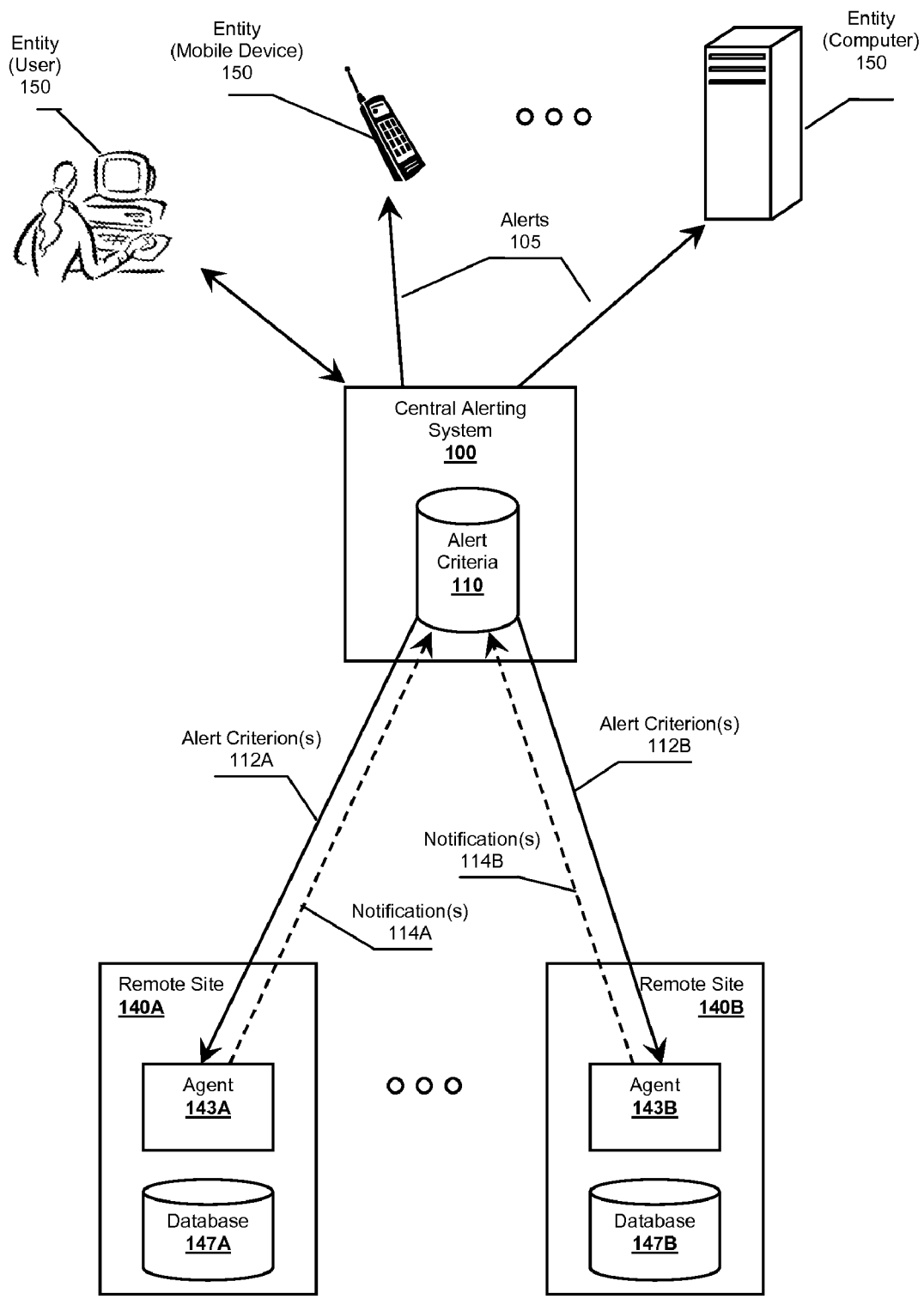
FIG. 1 is a schematic of a proactive information monitoring system having a centralized alerting system that aggregates notifications from various data sources.

In FIG. 1, Central Alerting System (CAS) 100 stores alert criteria 110 associated with alert 105. CAS 100 provides various alert criterions 112A through 112B to one or more of monitoring agents 143A through 143B. Agents 143A and 143B, preferably located at remote sites 140A through 140B, monitor records within databases 147A through 147B to determine if criterion 112A and 112B have been satisfied. Once satisfied, agents 143A and 143B send notifications 114A through 114B back to CAS 100. CAS 100 aggregates notifications 114 and determines if criteria 110 has been satisfied. CAS 100 then sends one or more of alerts 105 to entities 150.

Although entity 150 is depicted as a cell phone, computer, or person, it should be appreciated that an entity receiving alerts 105 can be any individual. For example, an entity can be a company, corporation, person, another computer system, or other entity that can receive alerts from CAS 100. As used herein "entity" is used to mean the recipient of an alert regardless if the entity is a person, a machine, or an organization. In a preferred embodiment, a consumer of the services provided by CAS 100 directs CAS 100 to send alerts 105 to one or more entities (e.g., mobile devices, computers, etc. . . . ).

Central Alerting System

CAS 100 preferably comprises an Internet accessible computer system that provides a for-fee service. CAS 100 includes sufficient software to support offering users of the service an interface for defining alert criteria 110, storing data associated with alert criteria 110, managing alerts, or other services relating to alerting. Contemplated fees can comprise a subscription, a pre-alert fee, a fee for amount of data sent, a purchase price for software, or other fees.

In a preferred embodiment CAS 100 provides an interface through which criteria 105 can be defined via a web accessible network connection. For example, a user of CAS 100 can logon on to a CAS server from a remote location. The user can use the interface provided by CAS 100 to define or otherwise program desirable criteria for an alert. Suitable interfaces include human interfaces or machine interfaces. Examples of human interfaces include one or more web pages or possibly a command line interface. Machine interfaces can include APIs or protocols used to accessing database.

Contemplated interfaces also allow a user to manage their alerts. Managing alerts can include monitoring activity of alerts, accounting for costs relating to alerts, inventorying, creating/deleting alerts, activating/deactivating alerts, updating alerts, generating activity reports, or other management related activities.

When a user wishes to obtain an alert, the user determines the circumstances under which the alert should be generated. In a preferred embodiment the circumstances are dictated by changes in one or more records of a data set spread across multiple, remote physical locations. The entity can interface with CAS 100 to identify available records of interest located across multiple remote sites 140A through 140B that can be used in conjunction with generating an alert.

CAS 100 can present to the user information relating to the records available from remote sites 140A through 140B. Rather than presenting the available records in a raw data format, CAS 100 preferably presents the available records in a normalized format to resolve inconsistencies among the various database formats used by databases 147A through 147B. CAS 100 normalizes the data record information obtained from the remote sites to present a consistent interface to the user defining the alert criteria. Normalization can occur locally to CAS 100 or remote to CAS 100. Software running locally can translate from each remote site's database schema to the normalized format. Additionally, agent 143A could translate from the format of database 147A to a format recognizable by CAS 100 for representation to the user.

It is contemplated that CAS 100 can offer a graphical user interface (GUI) to a user that allows the user to define alert criteria 110 easily. In some embodiments, records are offered as graphical objects that the user is able to manipulate or link with other records to define the various rules for criteria 110. It is specifically contemplated that a user could use such an interface to define template criteria that can be applied to large number of data sets. For example, a user can define a template criteria pertaining to all customers in their database. The user can provide the template criteria to CAS 100 through its interface. CAS 100 can then monitor all the records for the multiple data sets corresponding to the relevant customers. In this manner, an entity can define single criteria 110 that can be applied to thousands, millions, or more data sets of interest.

CAS 100 can obtain information about the records without compromising the security of the remote databases. For example, CAS 100 can query databases 147A via agent 143A about the available records. The remote site 140A can respond by simply stating that the record information is available without actually supplying the actual data. In this manner, the databases retain security as well as maintain privacy.

In a preferred embodiment, a business operating CAS 100 establishes one or more partnerships with other businesses owning or operating remotes site 140A or database 147A. In exchange for participating in the partnership, owners of remote sites or database can receive compensation in exchange for allowing access to their data. Contemplated compensation includes paying fees to the owners on a subscription basis, on a per-access basis, a per-amount of data exchanged basis, or other monetary exchange.

CAS 100 can obtain information relating to what records are available to users for alerting purposes from remote sites 140A through 140B. Rather than requiring remote site 140A to send actual data, remote site 140A could provide CAS 100 with metadata, or a schema, describing what records or fields are available to a user. Additionally, remote site 140A could restrict access to data on a record-by-record basis, if so desired, by either informing CAS 100 of the restrictions or via interaction with agent 143A. Such an approach provides for maintaining the confidentially and security of the remote databases while also alerts to be generated indicating interesting changes to the records of a data set.

Alert Criteria

Figure 2:
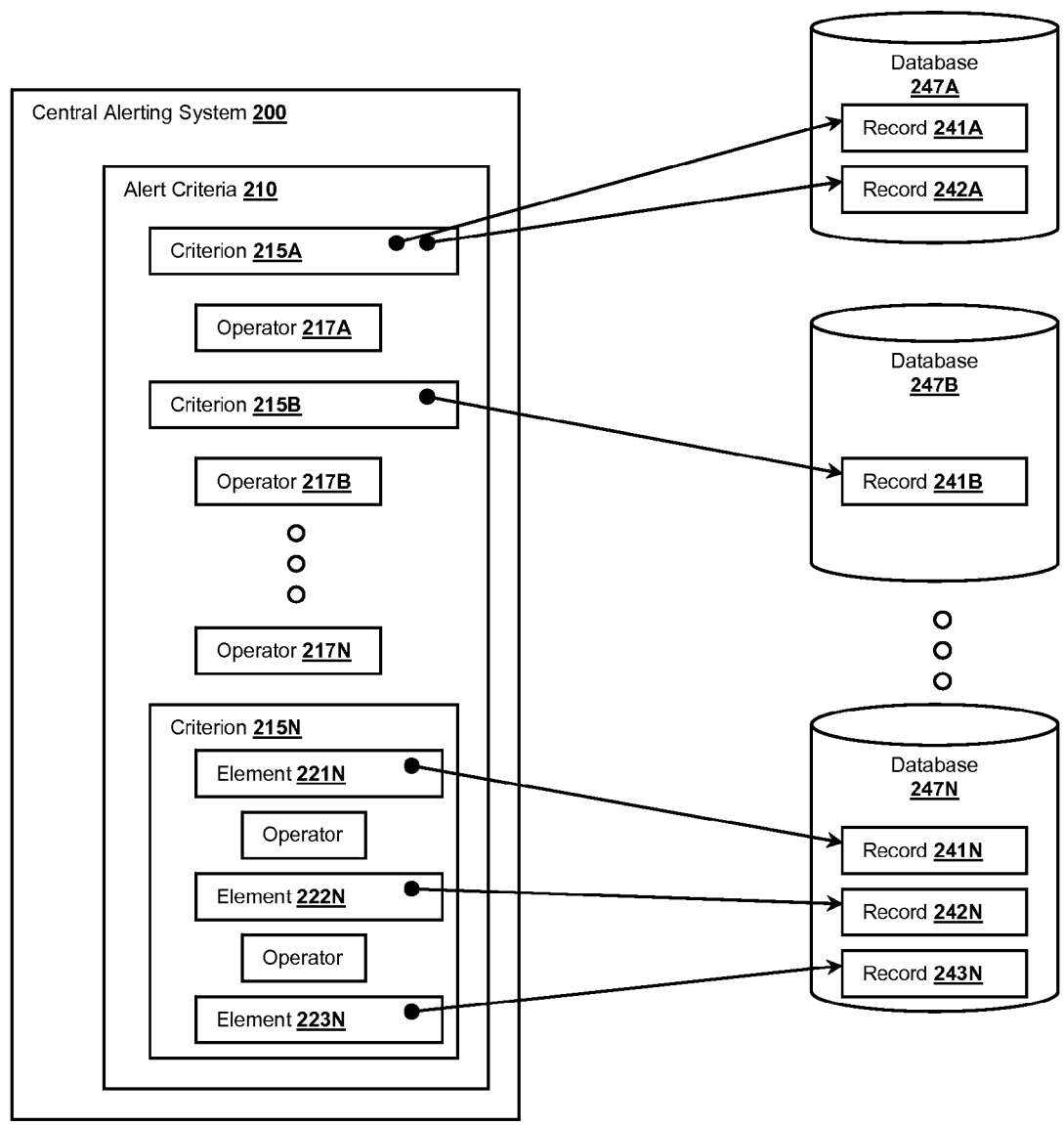
FIG. 2 is a schematic an alert criteria comprising multiple criterion corresponding to records in databases.

In FIG. 2, a user has defined alert criteria 210 designed to monitor one or more records of a data set spread across multiple remote databases 247A, 247B, through 247N. Alert criteria 210 comprises a plurality of criterion where each criterion preferably corresponds to a record on databases 247A through 247N. Criterions 215A through 215N are joined by operators 217A through 217N.

Criteria 210 can be considered a function that operates on records of a data set and generates a result indicating if alert criteria 210 has been satisfied. In some embodiments, criteria 210 can be consider a Boolean function of having a value of True (satisfied) or False (not satisfied). When criteria 210 is satisfied, CAS 200 can send an alert. As illustrated, criteria 210 represents a function of criterion 215 through 21N, operator 217A through 217N, and data set records stored in remote databases 247A through 247N.

A criterion can relate to one or more records located on a remote database. For example, criterion 215A corresponds to records 241A and 242B and criterion 215B corresponds to only record 241B.

Databases 247A through 247N can each be implemented using any suitable database software. In some embodiments, a database could be quite extensive spread over larger distances via a VPN or a WAN in a corporate environment, or could be a single locally deployed database. Example database software that can be used to construct acceptable databases include Access™, MySQL, PostgresSQL, or other known or yet to be invented databases.

In a preferred embodiment, CAS 200 analyzes alert criteria 210 defined the user and automatically disaggregates criteria 210 into criterion 215A through 215. This can be achieved because CAS 200 can have a mapping of the records available in a normalized format. When the user defines the rules for alert criteria 210 based on the available records, CAS maps conditions for each record into individual criterion on a record-by-record basis.

One should note that a database could have more than one record of interest associated with a data set (e.g., name, address, purchase history, etc. . . . ) as illustrated in database 247N by records 241N through 243N. In such cases, CAS 200 can define criterion 215N as comprising elements 221N through 223N that correspond to records 241N through 243N respectively. Within criterion 221N each element operates as an individual condition as joined by one or more operators. The value of criterion 215N (e.g., True or False; satisfied or not satisfied) is a function of elements 221N through 223N and their joining operators.

When criteria 210 is defined for an alert, CAS 200 can assign an alert identifier to the alert or alert criteria 210. The identifier can be used through out the system for identification purposes. It is also contemplated that each of criterion 215A through 215N and elements 221N through 223N can also be assigned an identifier. The use of identifiers reduces communication overhead when exchanging information with remote agents. Acceptable identifiers include globally unique identifiers (GUID) or universally unique identifiers (UUID). Additionally, criterion and elements can be identified within a hierarchical namespace for easy referencing. For example, an element can be referenced by an identifier of the form "<Alert GUID>.<Criterion ID>.<element ID>" wherein <Alert GUID> represents the identifier of the alert including alert criteria 210. <Criterion ID> references a criterion within criteria 210. <Element ID> references an element within the criterion.

Operators 217A through 217N represent functions that join or interrelate criterion 215A through 215N. An operator can be a logical operator, a function that operates on a record or records, or programmatic instructions in a computer language (e.g., SQL, C++, C#, C, Python, Perl, Ruby, etc. . . . ). Contemplated logical operators include AND, OR, XOR, NOT, IN, parentheses, or others operators. One skilled in the art will recognize that there are numerous possible methods for forming an operator, all of which are contemplated. In a preferred embodiment, CAS 200 utilizes relational links established by the user that defines criteria 210 to automatically create operators 217A through 217N.

Criteria 210 can also include time dependencies that govern the times when agents monitor records, when alerts are alive, or when alerts are inactive or active. For example, criteria 210 can be configured to be active during seasonal shopping periods, Christmas for example. Additionally, each of criterion 215A through 215N, or even elements 221N through 223N, can also have time dependencies.

It should be noted that a single criterion could be duplicated multiple times within criteria 210. For example, a customer's address is likely located across numerous remote sites. If a user wishes construct an alert that depends on a change of address, they would identify the address as a record of interest. Unfortunately, the entity might lack authorization to view which remote sites have the address records. However, CAS 200 could have authorization through one or more established partnerships. In response, CAS 200 creates a set of duplicate criterion, possibly one for each address record stored on different databases, where each criterion in the set is logically "OR-ed" together. If any of the address records stored on the different databases changes, the set of criterion would be satisfied and an alert will be sent to an entity.

Agents

Figure 3:
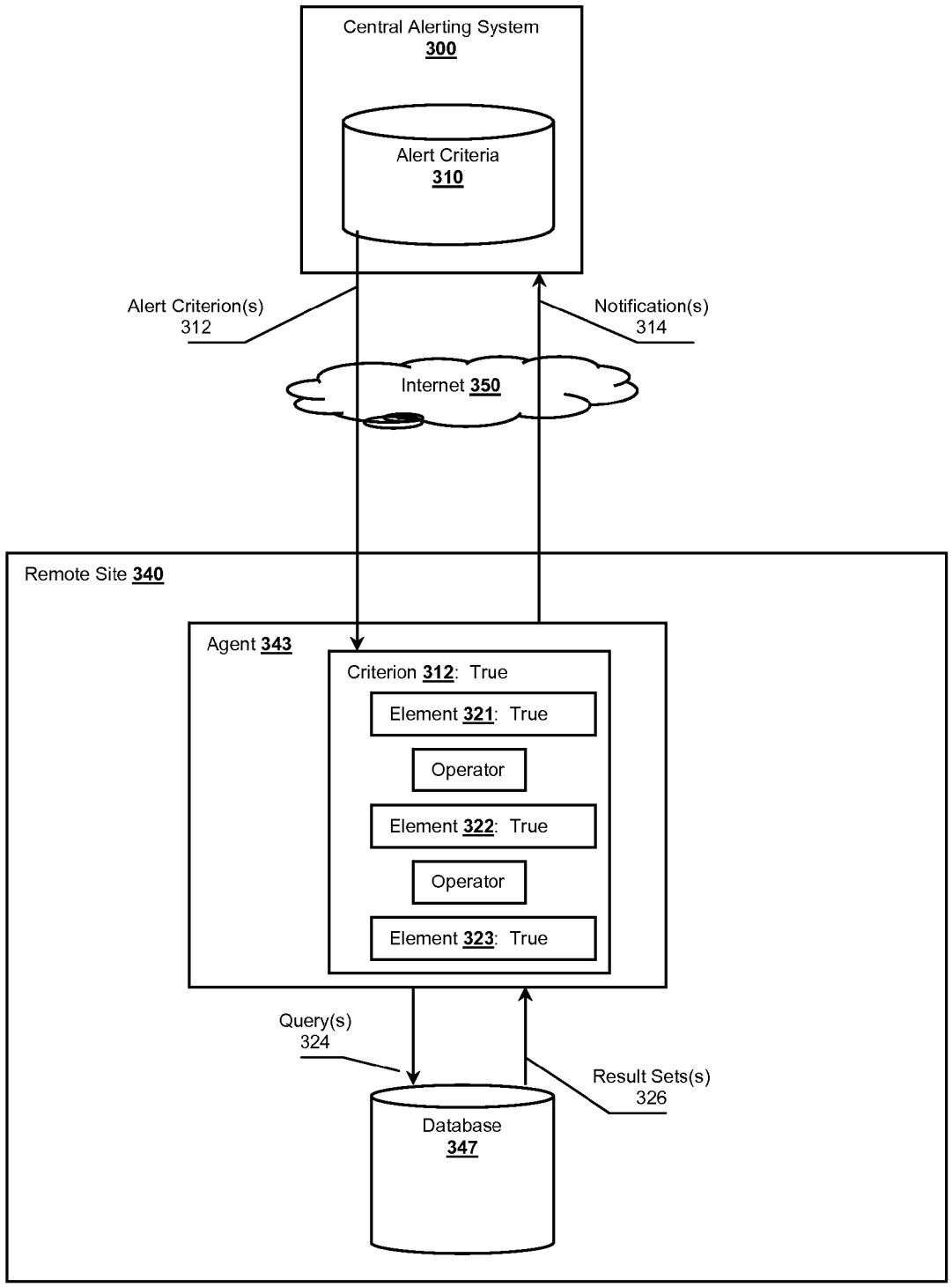
FIG. 3 is a schematic of an agent monitoring a database based on a criterion.

Once an alert criteria is defined, an agent can be instructed to monitor records associated with the criterion of the criteria. In FIG. 3, CAS 300 comprises alert criteria 310 having one or more of criterion 312. CAS 300 preferably sends criterion 312 to remote site 340 to instruct agent 343 to monitor records in database 347 and to send notification 314 once the records in database 347 satisfy criterion 312.

Agent 343 comprises a set of software modules preferably providing instructions to translate alert criterion 312 from a normalized command format understood by CAS 300 into a command format understood by database 347. For example, agent 343 could receive criterion 312 having information with respect to an address of a customer. Agent 343 can then covert the address information and associated operators into one or more SQL queries that can be sent to database 347 to check the value or status of the address information. It is also contemplated that the translation of criterion 312 from the normalized format into a native database format can be performed by CAS 300.

Given the myriad of different types of databases or native command formats that can be used to implement database 347, is should be appreciated that agent 343 operates as a database adapter allowing CAS 300 to interface to database 347. It should be noted that providing and deploying different versions of agent 343 each configured as an adapter for a different database falls within the scope of the inventive subject matter. For example, agent 343 can be deployed at remote site 340 by installing agent software configured to interface to database 347 on a computer system host the database. It is also contemplated that agent 343 can be deployed as an agent software development kit. The kit can include libraries that interface to CAS 300 and a programmer's guide having instructions on how to properly write a driver for a database. Such an approach allows CAS partners (e.g., owners of database 347) to create agents that can interface to proprietary databases.

In a preferred embodiment, agent 343 is located remote to CAS 300 and local to database 347 at remote site 340. Placing agent 343 remote to CAS 300 offers several advantages. One advantage is that agent 343 can operate as a data filter between database 347 and CAS 300 under control of the database owner to maintain the privacy and security of database 347. For example, when criterion 312 is satisfied, agent 343 can send notification 314 only including data that indicates that the value of criterion 312 is True without sending actual record data over the network. Another advantage includes parallelizing the monitoring of records. Rather than having CAS 300 monitor all records located on remote databases, each agent can work in parallel thereby increasing the responsiveness of the over all system. Although in a preferred embodiment agent 343 is placed remotely, it is also contemplated that agent 343 could operate within the bounds of CAS 300 and could communicate over a network (e.g., Internet 350) with databases 347.

CAS 300 communicates alert criterion 312 with agent 343 using any suitable communication means. In a preferred embodiment, CAS 300 establishes a network connection using known networking protocols (e.g., HTTP, TCP, UDP, IP, etc. . . . ) to exchange command messages or data with agent 343. CAS 300 can also employ one or more secure protocols to further enhance the security or privacy provided by the system. For example, CAS 300 could establish secure connection using secure protocols (e.g., SSL, SSH, HTTPS, etc. . . . ), using various authentications methods (e.g., Kerbros, RADIUS, SecureID, OpenID, etc. . . . ), using encryption algorithms (e.g., AES, DES, 3DES, PGP, etc. . . . ), or other using other cryptographic protocols or algorithms.

Upon recite of criterion 312, agent 343 stores criterion 312 and any corresponding elements 321 through 323 in memory using an appropriate data structure. The data structure can include instructions, commands, time dependencies, or other data defining criterion 312. Agent 343 monitors database 347, preferably by interfacing directly with database 347. Monitoring can be achieved through any suitable means for checking the status of records associated with the elements.

One acceptable example for monitoring records in database 347 includes instructing agent 343 to periodically or proactively poll database 347 for the status of each record by sending queries 324 on a periodic basis. In support of the real-time nature of information monitoring, preferred polling cycles are less than 24 hours, more preferably less than one hour, and yet more preferably less than 10 minutes. Database 347 responds to the queries by providing one or more of result set 326. It should be noted that result set 326 could include actual data from database 347 that can be analyzed o filtered by agent 343, or could minimally include an indication that a record has satisfied an element of criterion 312. Sending only an indication aids in retaining the confidentiality of database 347 by ensuring that data does not leave database 347 in an unauthorized fashion. When database 347 is secured, agent 343 can authenticate itself before exchanging data with database 347 using known authentication techniques including username-password, RADIUS, SecureID, OpenID, Kerberos, or other forms of authentication.

Another example of an acceptable method for monitoring records includes agent 343 sending query 324 to database 347 where database 347 itself stores query 324 as an event listener. As changes are made to database 347 relating to records of interest, the event listener is triggered when the record satisfies query 324. Database 347 sends result set 326 in real-time back to agent 343 for processing. Such an approach increases the responsiveness of the system.

Agent 343 preferably sends notification 314 to CAS 300 to indicate that criterion 312 has been satisfied. Notification 314 can be sent back to CAS 300 using similar networking protocols as used to send criterion 312 to agent 343. When agent 343 sends notification 314 back to CAS 300, the notification can be packaged in any suitable form. In some embodiments, notification 314 includes minimal information about criterion 312. For example, notification could merely include a criterion identifier, possibly a GUID or UUID, associated with criterion 312 or with alert criteria 310. In other embodiments, additional information is packaged with notification 314 including time stamps, data generated by agent 343, or record data from database 347 assuming, proper authentication or authorization to access the record data has been granted.

CAS 300 can interface to one or more of database 347. In a preferred embodiment each of database 347 is unaffiliated with other databases storing data set records. As used herein "unaffiliated" means that the remote databases accessed by CAS 300 are owned or operated by different third-party entities. For example, CAS 300 could interface with two remote databases where a first database is owned and operated by a bank and a second database is owned an operated by a car dealership. Neither of these databases would be aware of each other nor depend on each other. However, CAS 300 can aggregate notification information from these unaffiliated databases to provide meaningful, useful alerts to a third entity.

It is also contemplated that two or more of database 347 can operate independently of each other where each database is physically distinct even if the databases are affiliated with each other. For example, a large corporation could have a first CRM database storing customer information and a second technical support database storing incidents where the first database runs on a different computer system or runs different software than the second database. CAS 300 can interface with each of the databases via different agents.

CAS 300 and agent 343 can also exchange data other than criterion 312 or notification 314 for various reasons. Contemplated additional data exchanges include deploying agent 343 at remote site 340, providing software updates to agent 343, requesting or receiving status with respect to criterion 312, management of agent 343, or other interactions. Data exchange between CAS 300 and agent 343 can also be initiated by agent 343. For example, agent 343 could send CAS 300 a periodic heartbeat comprising status of all pending criterion.

One aspect of the inventive subject includes the construction of a protocol for use among the various components of the alerting system. A preferred protocol operates on TCP/IP and supports secure connections, possibly through SSL. An especially preferred protocol comprises a standard protocol as approved by a recognized standards body (e.g., IETF, IEEE, W3C, etc. . . . ). CAS oriented protocols also comprise commands for managing agents, checking status of criteria or criterion, modifying existing criteria, packaging or framing notifications, providing authentication of agents with respect to CAS, or other commands.

Alerts

Figure 4:
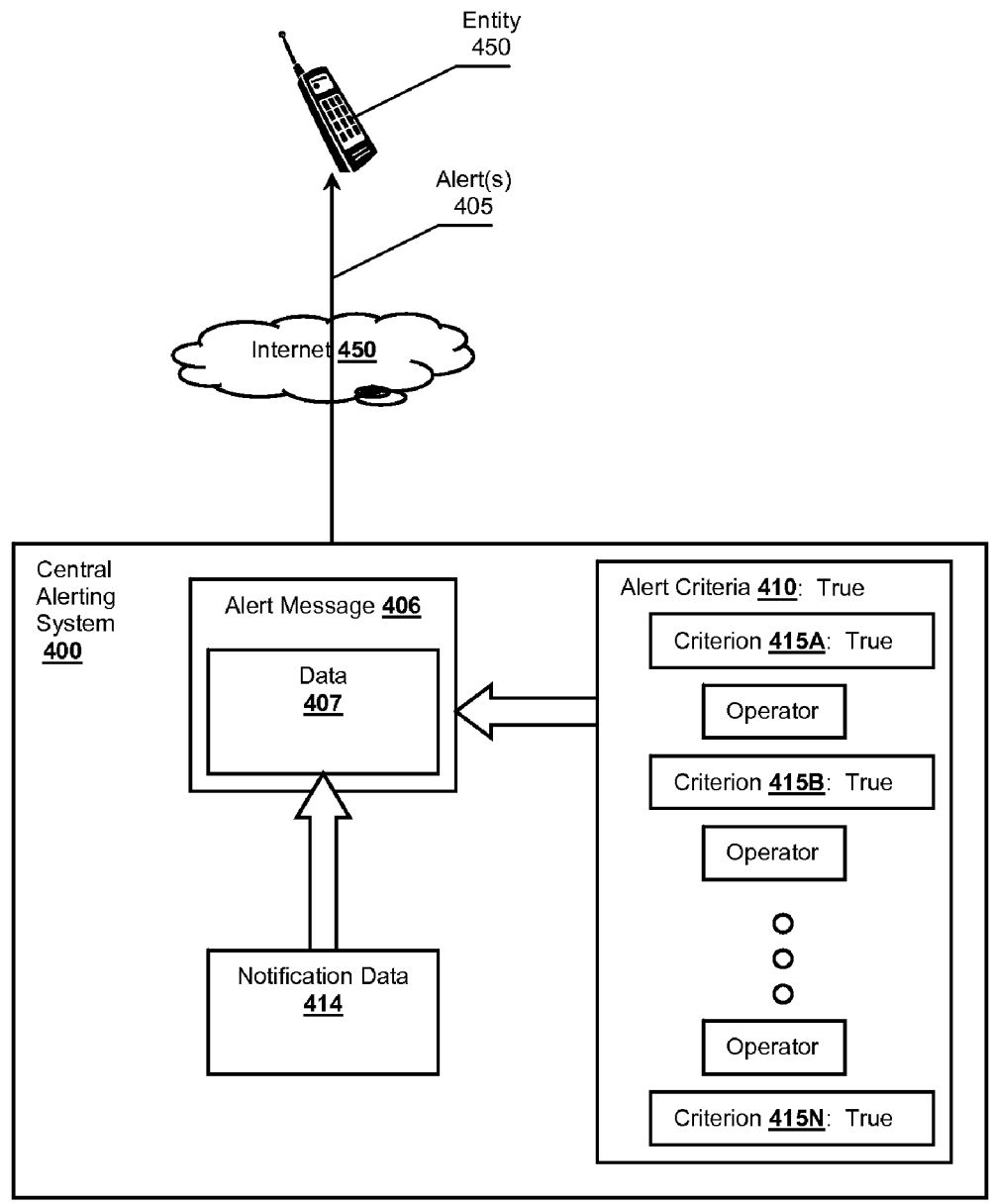
FIG. 4 is a schematic of a central alerting system sending an alert to an entity when an alert criteria is satisfied.

In FIG. 4, CAS 400 aggregates notifications from agents monitoring records on remote databases. As notifications arrive, CAS 400 updates alert criteria 410 or criterion 415A through 415N based on received notification information. CAS 400 can also aggregate notifications and data from the agents to form notification data 414 that can be packaged with a sent alert. When the notification information cause alert criteria 410 to become satisfied, alert 405 can be sent to entity 450.

CAS 400 prepares alert message 406 to be sent over a network (e.g., Internet 450). Alert message 406 can include data 407 relating to the alert, alert criteria 410, or notification data 414 received from remote agents. It is also contemplated that data 407 can include record data packaged along with message 406. However, obtaining record data could require proper authentication or authorized from the owners of the remote databases.

CAS 400 prepares message 406 and preferably sends alert 405 to entity 450 in near real-time (e.g., less than 30 minutes) with respect to when alert criteria 410 becomes satisfied. In a preferred embodiment, CAS 400 sends alert 405 within 30 minutes of alert criteria 410 being satisfied, more preferably within 10 minutes, and yet more preferably within 5 minutes.

Alert 405 encapsulates alert message 406 and can take on many different messaging formats. In some embodiments, alert 405 can be in a human understandable format including an email, an instant message, a voice message, a blog post, a web page, or other modality that a human can readily understand. In other embodiments, alert 405 can be in a machine understandable form including binary packed data, a database command, or other machine oriented communication. It is specifically contemplated that CAS 400 can send a native database command to entity 450 so the alert information can be inserted directly into a database managed by the entity for later retrieval.

FIG. 4 illustrates a single alert 405 being sent to entity 450. However, one should recognize that alerts can be sent as a batch. For example, the same alert 405, or variants, can be sent to multiple entities 450 (e.g., computers, mobile phones, people, etc. . . . ). Additionally, multiple, different alerts can be sent as a batch at the same time. CAS 400 collects alerts over a time period (e.g., an hour, a day, a week, etc. . . . ) and at an appointed time CAS 400 disseminates all the alerts to their recipients.

The inventive subject matter has been presented as having a CAS and edge agents that provide notification back to the CAS. It should also be noted that the system could comprises any number of intermediary aggregation nodes that funnel notifications back to a hub CAS. For example, the CAS system could have several geographically separated CAS. A CAS could be deployed in Asia, in Europe, and in the United States. The United States CAS could disaggregate an alert criteria into portions and forward the portions to the European and Asian CAS. Each of the remaining CAS further forward portions of the criteria or criterion to remote agents. When a criterion becomes satisfied, notifications are sent back through the chain to the origination CAS, which can then send an alert. In some embodiments, the contemplated alerting system has three intermediary nodes, five intermediary nodes, or ten or more intermediary nodes.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of monitoring changes in a data set, the method comprising:

providing a central alerting system having a mapping of remote records in the data set;

defining criteria on the central alerting system for an alert;

automatically desegregating, by the central alerting system, the criteria into multiple criterion by mapping criteria conditions into individual criterion on a record-by-record basis where each criterion of the criteria is associated with at least one of the remote records in the data set;

instructing a first remote agent to monitor a first record of the data set located in a first remote database, and to send a first notification to the central alerting system when the first record satisfies a first criterion of the criteria;

instructing a second remote agent to monitor a second record of the data set in a second remote database unaffiliated with the first database, and to send a second notification to the central alerting system when the second record satisfies a second criterion of the criteria;

aggregating the first and the second notifications at the central alerting system; and sending the alert from the central alerting system to an entity when the criteria for the alert have been satisfied as indicated by the first and the second notifications.

2. The method of claim 1, further comprising packaging the alert with the first record to be sent along with the alert.

3. The method of claim 1, further comprising providing an interface through which the criteria can be defined.

4. The method of claim 1, wherein the instructing the first agent includes translating the first criterion into a native command of the first database.

5. The method of claim 1, further comprising authenticating the first agent with respect to accessing the first database.

6. The method of claim 1, further comprising the first agent monitoring the first record through sending a query to the first database periodically.

7. The method of claim 1, further comprising charging a fee in exchange for sending the alert.

8. The method of claim 1, further comprising deploying the first agent local to the first database and remote to the central alerting system.

9. The method of claim 1, wherein the step of instructing the first agent includes sending a command message from the central alerting system over a network to the first agent.

10. The method of claim 1, wherein sending the alert comprises sending at least one of the following: an email, an instant message, a blog post, a text message, and a voice message.

11. The method of claim 1, wherein sending the alert comprises sending a command to a database managed by the entity.

12. The method of claim 1, further comprising instructing a third agent to monitor a third record of the data set located in a third database affiliated with and independent of the first database, and to send a third notification to the central alerting system when the third record satisfies a third criterion of the criteria.

13. The method of claim 1, further comprising establishing a partnership with owners of the first and the second database to gain access to the first and the second database.

14. The method of claim 13, further comprising paying a fee to the owners in exchange for accessing the first and the second databases.

15. The method of claim 1, wherein the step of sending the alert occurs in near real-time.

16. The method of claim 1, wherein the step of sending the alert includes sending a batch of alerts.

17. The method of claim 1, wherein the criteria comprises time dependencies.

18. The method of claim 3, wherein the central alerting system maps criteria conditions into individual criterion on a record-by-record basis occurs in response to the interface receiving a definition of the criteria.

19. The method of claim 1, wherein mapping of remote records in the data set is available in a normalized format.

20. The method of claim 1, further comprising assigning an identifier to each of the multiple criterion.

* * * * *